United States Patent Office 3,787,392
Patented Jan. 22, 1974

3,787,392
PROCESS FOR THE PREPARATION OF NUCLEOSIDE DIPHOSPHATE ESTERS
Hans Ulrich Bergmeyer, Tutzing, Eric Haid, Weilheim, Michael Nelboeck-Hochstetter, Tutzing, and Gunter Weimann, Percha, Germany, assignors to Boehringer Mannheim GmbH, Mannheim-Waldhof, Germany
No Drawing. Filed Nov. 26, 1971, Ser. No. 202,573
Claims priority, application Germany, Dec. 2, 1970,
P 20 59 429.0
Int. Cl. C07d 51/50
U.S. Cl. 260—211.5 R       14 Claims

ABSTRACT OF THE DISCLOSURE

Nucleoside diphosphate esters are prepared by reacting a nucleoside monophosphate with a phosphoric acid ester in the presence of dicyclohexyl carbodiimide, wherein a methanol solution of a nucleoside monophosphoric acid and dicyclohexyl carbodiimide is slowly brought together with a 1 to 6.5 pH methanol solution of a phosphoric acid ester.

---

The present invention is concerned with a process for the preparation of nuceloside diphosphate esters. Specifically, this process comprises the reaction of a nucleoside phosphate with a phosphoric acid ester in the presence of cyclohexyl carbodiimide.

It is already known to prepare nucleoside diphosphate esters by the reaction of a nucleoside phosphate with a phosphoric acid ester in the presence of dicyclohexyl carbodiimide, using pyridine or formamide as solvent. This process suffers from the disadvantage that it requires a period of reaction of seven days, gives rise to numerous by-products and only gives unsatisfactory yields, e.g., of up to about 45%.

According to another known process, a nucleoside-5'-phosphoramide, in the form of a dicyclohexyl-guanidinium salt, is condensed with a phosphoric acid ester by heating for 16 hours in o-chlorophenol at 100° C. In the case of this process, the period of reaction is admittedly shortened but the yields are just as unsatisfactory as in the case of the other above-mentioned known process.

Besides these known chemical processes, the enzymatic preparation of various nucleoside diphosphate esters by the reaction of the corresponding nucleoside triphosphate with phosphoric acid esters in the presence of appropriate enzymes has also been described. However, this process is unsuitable for a large-scale preparation of the desired products.

The present invention provides a process for the chemical preparation of nucleoside diphosphate esters, which does not suffer from the above-mentioned disadvantages. The process from this invention produces the desired compounds in good yields, in a short reaction time and lead to the desired compounds without formation of substantial amounts of undesirable by-products.

The present invention provides a process for the preparation of nucleoside diphosphate esters which comprises reacting a nucleoside monophosphate with a phosphoric acid ester in the presence of dicyclohexyl carbodiimide, by slowly contacting a methanolic solution of a nucleoside monophosphoric acid ester, which contains dicyclohexyl carbodiimide and optionally a solubilizing agent, with a methanolic solution of a phosphoric acid ester which has a pH value of between 1 and 6.5 and preferably of 4 to 5.

The reaction can be carried out at ambient temperature or at a slightly elevated temperature and leads, within a few hours, to yields of 90% or more.

It is especially surprising that, under the conditions of the process according to the present invention, the nucleoside-5-phosphate esters with the solvent used, i.e. the esters of methanol, are not formed or are only formed in very small amounts because J. Moffat and H. G. Khorana (J. Am. Chem. Soc., 83, 649/1961) have described the practically quantitative formation of such methyl ester under similar conditions. Furthermore, it is surprising that nto only does hardly any ester formation with the solvent occur but also hardly any dinucleoside pyrophosphates are formed.

The nucleoside monophosphoric acid used as starting material can be derived from a naturally-occurring or synthetic nucleoside. Examples of natural nucleosides include cytidine, uridine, thymidin, 5-methyl-cytidine, 5-hydroxymethyl-cytidine, pseudouridine, adenosine, guanosine and inosine, as well as the corresponding 2'-desoxy compounds. Most of the synthetic nucleosides which can be used are derived from the above-mentioned natural nucleosides.

In the case of the second component used in the process according to the present invention, i.e. the phosphoric acid ester, the phosphoric acid can be esterified with any appropriate hydroxyl group-containing organic compound, provided that the phosphoric acid ester is sufficiently soluble in the solvent used in the process according to the present invention. Examples of hydroxyl group-containing organic compounds which can be used in the form of their phosphoric acid esters, include mono- and polyhydroxy alcohols and amino-alcohols, for example, ethanolamine, choline, sugars, such as glucose, mannose, galactose and ribose, glyceraldehyde and the corresponding ketoses and amino sugars. Preferred phosphoric acid esters for use in the process of the present invention include choline phosphate, ethanolamine, phosphoric acid, glucose-1-phosphate, glucose-6-phosphate, galactose-1-phosphate, mannose-1-phosphate, glucosamine-1-phosphate, galactosamine-1-phosphate, mannosamine-1-phosphate and the corresponding N-acetyl compounds.

Methanol is used as the solvent but it can be partially replaced by alkanols containing up to 4 carbon atoms and/or by lower dialkyl ketones containing up to 3 carbon atoms in each alkyl radical and/or by dimethyl-formamide. However, the yields are, in general, thereby not as good.

Especially good results are obtained when the process is carried out in the presence of a solubilizing agent, for example, piperidine, cyclohexylamine, aniline or, preferably, morpholine.

The acid used for the adjustment of the pH value to the required range between 1 and 6.5 can, in principle, be an inorganic or organic acid which is soluble in the solvent used, the hydrohalic acids, especially hydrochloric acid, being preferred. As a result of the water tolerance of the process according to the present invention, the acids used, especially the hydrohalic acids, can contain water and be in the form of, for example, concentrated hydrochloric acid. The acids used are those which do not lead to the precipitation of one of the reaction components or do not react irreversibly with one of the reaction components, for example, sulphuric acid to nitric acid.

The phosphoric acids can be used in the form of their salts, especially of their commercially available alkali metal and alkaline earth metal salts, the calcium salts having proved to be especially useful. It is assumed that the calcium ions exert a solubilizing action. However, sodium, potassium, lithium, strontium, magnesium and barium salts, as well as salts with organic amines, have also proved to be useful. The calcium salts can also be used in the form of mixed salts, for example, as mixed salts with hydrohalic acids, such as choline phosphate calcium chloride. This is an especial advantage of the process according to the present invention because many of the reagents used are commercially available in the form of their calcium salts and some of them in the form of their calcium chloride salts, and, in this form, can be used directly without previous drying.

As already stated, it is essential that the solution of the phosphoric acid ester has an acidic pH value, the best results being achieved at pH values between 4 and 5. However, depending upon the starting materials used, lower pH values can also be advantageous. Nevertheless, below pH 4, the tendency for the formation of the methyl ester increases.

The reaction temperature is not critical and the reaction can be carried out at temperatures between 0 and about 80° C., temperatures between 20 and 60° C. being preferred.

An important feature of the process according to the present invention is the slow addition of the acidic phosphoric acid ester solution to the solution of nucleoside phosphoric acid and dicyclohexyl carbodiimide in methanol. Preferably, this addition takes place by the dropwise addition of the phosphoric acid ester solution into a well-stirred solution of the nucleoside phosphoric acid.

The purification and working up of the products obtained is simple because they are already obtained in a comparatively pure form and, in general, only contain traces of impurities. In many cases, the product crystallizes out directly in the course of the reaction, for example, in the form of the calcium salt. Precipitation of the product can be promoted by the addition of a further solvent for reducing the solubility of the product, for example, isopropanol.

A special advantage of the process according to the present invention is its simplicity. It can be carried out as a one pot process in a relatively short period of time with the use of very simple apparatus. The products can be obtained and purified very easily. Only simple and cheap solvents are used and, as a result of a certain water tolerance, these solvents do not have to be specially dried. Thus, the otherwise necessary great expenditure of time for the removal of water from the reaction medium by means of azeotropic distillation, treatment with molecular sieves or the like is now no longer needed. The advantage that the starting materials can mostly be used in the form of commercially available salts has already been pointed out.

The products obtainable by the process of the present invention are physiologically interesting and, therefore, are used not only as pharmaceuticals but also in research. Many of the compounds obtainable play a very large part in physiological cellular processes, for example, in the biosynthesis of phosphatides, of cell wall structures and the like. Thus, the biosynthesis of phosphatides, such as lecithine, cephaline and sphingo-myelin takes place by activation of the base and, in the case of the other compounds with less basic residues, such as serine, inositol and cardiolipin, by activation of the diglyceride. The activation thereby consists, in all cases, in the formation of the corresponding cytidine diphosphate compound, which can then further transmit the activated residue. In the case of a number of diseases with phosphatide participation, the phospholipids occur in reduced amounts, for example, in the case of the "glycolipid diseases," sphingolipidosis (Nieman-Pick disease) and the like. Cytidine diphosphate choline, obtainable by the process according to the present invention, was successfully administered, for example, in cases of brain damage as lecithin precursor and led to remarkable improvements of the clinical symptoms. The survival rate in the case of brain damages could be considerably increased by treatment with this substance.

The following examples are given for the purpose of illustrating the present invention, and are not to be construed as unduly limitative thereof.

EXAMPLE 1

Preparation of uridine diphosphate glucose 10 g. (about 30 mM.) uridine-5'-monophosphate (U–5'–MP), in the form of the free acid, were brought into solution in 500 ml. pure methanol by the addition of 7.5 ml. morpholine and, after the addition of 10 g. dicyclohexyl carbodiimide, the reaction mixture was warmed to 50° C. 90 mMol glucose-1-phosphate morpholine salt, dissolved in 500 ml. methanol and adjusted with concentrated hydrochloric acid to pH 4 were slowly added dropwise to this solution. After a period of reaction of 12 to 15 hours at 50° C., 500 ml. isopropanol were added with good stirring and the precipitate formed was centrifuged off, dissolved in 250 ml. water, neutralized and applied to an IMAC–A–17 column (500 ml. content, formate formed) and eluted with a linear gradient of 0–0.5 N ammonium formate (pH 4). The fractions containing uridine diphosphate glucose, which were eluted from the column at an ammonium formate concentration of about 0.4 N, were immediately desalinated by passing through a column containing 2 liters of charcoal. The elution from the charcoal column was carried out with isopropanol; water:sodium hydroxide (50:50:0.5). The eluates were adjusted to pH 7.2 with sodium hydroxide solution and the solution was concentrated in a vacuum, whereafter the sodium salt of uridine diphosphate glucose was precipitated by the addition of the 10 fold volume of methanol. Yield: 8.5 to 9 g. (about 50% of theory, referred to the amount of U–5'–MP used).

Analogously, with the use of galactose-1-phosphate morpholine salt, there was obtained the corresponding uridine diphosphate galactose.

EXAMPLE 2

Preparation of adenosine diphosphate galactose 15 g. galactose-1-phosphate morpholine salt were dissolved in 500 ml. methanol and, by the addition of concentrated hydrochloric acid, the pH value of the solution was adjusted to 4. This solution was slowly added dropwise to 200 ml. methanol which had a temperature of 50° C. and contained 5 g. adenosine-5'-monophosphate (A–5'–MP) in the form of the free acid, 3.5 ml. morpholine and 5 g. dicyclohexyl carbodiimide. After a period of reaction of 15 hours at 50° C. and at a pH value of 4–4.5, 250 ml. isopropanol were added, with good stirring. The precipitate obtained was centrifuged off and dissolved in 200 ml. distilled water, the pH value was adjusted to 7 and the solution was subsequently applied to an anion exchanger column (500 ml. content; Dowex 1X2 type, formate form). The product was eluted with 0.7 N sodium formate solution and further worked up over charcoal as in Example 1. The yield of the sodium salt of adenosine diphosphate galactose is 4.5 g. (about 50% of theory, referred to the amount of A–5'–MP used).

EXAMPLE 3

Preparation of cytidine diphosphate ethanolamine 14.5 g. (about 100 mM.) ethanolamine phosphoric acid and 15 g. calcium chloride dihydrate were dissolved in about 55 ml. distilled water, acidified with about 5 ml. concentrated hydrochloric acid and made up to 500 ml. with methanol. This solution was slowly added dropwise to 250 ml. methanol which has a temperature of 50° C. and contains 11 g. cytidine-5'-monophosphate (C–5'–MP), in the form of the free acid, 8 ml. morpholine and 11 g. dicyclohexyl carbodiimide. After a period of reaction of about 15 hours at 50° C., 300 ml. isopropanol were added and the precipitate obtained was filtered off, dissolved in water, neutralized and chromatographed on an anion exchanger column (Dowex 1X2 type, formate form, 50–100 mesh, 1000 ml. content). After a pre-wash the column was eluted with 0.02 M formic acid to give cytidine diphosphate ethanolamine. The cytidine diphosphate ethanolamine-containing fractions were concentrated, neutralized with sodium hydroxide solution and finally crystallized by the addition of ethanol. The crystals were fitlered off with suction, washed with ethanol and dried. Yield: about 12 g. (70% of theory, referred to the amount of C-5'-MP used).

EXAMPLE 4

Preparation of cytidine diphosphate choline 2 g. cytidine phosphoric acid were dissolved in 100 ml. pure methanol by the addition of 1.5 ml. morpholine, and, after the addition of 2 g. dicyclohexyl carbodiimide, the solution was heated to about 50° C. A solution of 5 g. choline phosphate calciumchloride in 175 ml. methanol, which contained 2.0 ml. 36% hydrochloric acid was slowly added to the above reaction solution. After a reaction time of 12 to 15 hours at 50° C., 250 ml. isopropanol were added, with good stirring. The precipitate obtained was centrifuged off, dissolved in 200 ml. distilled water and applied to a chromatography column containing 250 ml. anion exchanger (Dowex 1X2 in formate form). The column was washed with 500 ml. distilled water and then eluted with 0.05 N formic acid. The cytidine diphosphate chloline-containing fractions were evaporated to dryness, dissolved in a little water, neutralized with sodium hydroxide solution and crystallized by the addition of ethanol. Yield: 3.2 g. cytidine diphosphate choline—Na. $4H_2O$ (90% of theory).

EXAMPLE 5

Preparation of guanosine diphosphate glucose 5 g. guanosine-5-monophosphate, in the form of the free acid, were dissolved in 100 ml. distilled water containing 5 ml. morpholine and concentrated to about 15 ml. To this concentrate were added 100 ml. methanol, 2 ml. morpholine and 8 g. dicyclohexyl carbodiimide. While stirring gently, a solution of 15 g. glucose-1-phosphate morpholine salt in 500 ml. methanol, adjusted to pH 4 with concentrated HCl, was slowly added dropwise at 50–55° C. to the reaction mixture. After termination of the addition of the glucose-1-phosphate, the pH value of the reaction solution was adjusted with concentrated hydrochloric acid to 4.5. After a further 10 to 15 hours at pH 4.5, the reaction was ended. The reaction solution was concentrated in a vacuum to about 200 ml. and the guanosine diphosphate glucose formed was precipitated out by the addition of 400 ml. isopropanol. The precipitate was dissolved in water, neutralized and, in the manner described in Example 1, purified over an IMAC-A 17 column, desalinated over charcoal and precipitated by the addition of methanol. Yield: 3.5 g. (40% of theory) guanosine diphosphate glucose-$Na_2$.

It will be understood that the specification and examples are illustrative but not limitative of the present invention and that other embodiments within the spirit and scope of the invention will suggest themselves to those skilled in the art.

What is claimed is:

1. Improvement in the process for the preparation of nucleoside diphosphate esters by the reaction of a nucleoside monophosphate with a phosphoric acid ester soluble in methanol in the preesnce of dicyclohexyl carbodiimide, which improvement comprises slowly bringing together (1) a methanol solution of a nucleoside monophosphoric acid and dicyclohexyl carbodiimide, with (2) a methanol solution of a phosphoric acid ester which latter solution has a pH value between 1 and 6.5.

2. Improvement according to claim 1, wherein said methanol solution of the phosphoric acid ester has a pH value of 4 to 5.

3. Improvement according to claim 1, wherein said reaction is carried out at a temperature between 0 and 80° C.

4. Improvement according to claim 3, wherein said reaction is carried out at a temperature between 20° and 60° C.

5. Improvement according to claim 1, wherein the said methanol solution of the nucleoside monophosphoric acid contains a solubilizing agent.

6. Improvement according to claim 5, wherein the solubilizing agent is at least one amino compound selected from the group consisting of morpholine, piperidine, cyclohexylamine and aniline.

7. Improvement according to claim 1, wherein the pH value of said phosphoric acid ester solution is adjusted with concentrated hydrohalic acid.

8. Improvement according to claim 1, wherein said phosphoric acid ester is used in the form of an alkali metal or alkaline earth metal salt thereof.

9. Improvement according to claim 1, wherein said phosphoric acid ester is used in the form of a salt of an organic amine thereof.

10. Improvement according to claim 8, wherein the phosphoric acid ester is used in the form of a calcium salt or of a mixed calcium salt.

11. Improvement according to claim 1, wherein choline phosphate is used as said phosphoric acid ester.

12. Improvement according to claim 1, wherein at least one of said methanol solutions additionally contains another alkanol of up to 4 carbon atoms.

13. Improvement according to claim 1, wherein at least one of said methanol solutions additionally contains a dialkyl ketone of up to 3 carbon atoms in each alkyl radical.

14. Improvement according to claim 1, wherein at least one of said methanol solutions additionally contains dimethylformamide.

References Cited

UNITED STATES PATENTS 3,534,017   10/1970   Fujimoto et al. ___ 260—211.5 R
3,666,748   5/1972   Honjo et al. _____ 260—211.5 R JOHNNIE R. BROWN, Primary Examiner